(12) United States Patent
Koegel et al.

(10) Patent No.: US 8,726,773 B2
(45) Date of Patent: May 20, 2014

(54) TABLE SAW HAVING AIRFLOW APPARATUS

(75) Inventors: Jan Koegel, Arlington Heights, IL (US); Eric Hendrickson, Palatine, IL (US)

(73) Assignee: Robert Bosch GmbH, Stuttgart (DE)

( * ) Notice: Subject to any disclaimer, the term of this patent is extended or adjusted under 35 U.S.C. 154(b) by 481 days.

(21) Appl. No.: 12/907,498

(22) Filed: Oct. 19, 2010

(65) Prior Publication Data
US 2012/0090440 A1    Apr. 19, 2012

(51) Int. Cl.
B26D 7/18 (2006.01)

(52) U.S. Cl.
USPC ............... 83/99; 83/471.3; 83/477; 83/477.2

(58) Field of Classification Search
USPC ........ 83/99, 100, 471.3, 477.2, 168, 169, 490
See application file for complete search history.

(56) References Cited

U.S. PATENT DOCUMENTS

| | | | |
|---|---|---|---|
| 3,538,964 A | 11/1970 | Warrick et al. | |
| 4,063,478 A | 12/1977 | Stuy | |
| 4,255,995 A * | 3/1981 | Connor | 83/100 |
| 4,721,023 A * | 1/1988 | Bartlett et al. | 83/100 |
| 5,123,317 A | 6/1992 | Barnes, Jr. et al. | |
| 5,931,072 A | 8/1999 | Shibata | |
| 6,009,782 A | 1/2000 | Tajima et al. | |
| 6,370,997 B1 | 4/2002 | Rugen et al. | |
| 6,470,778 B1 | 10/2002 | Kaye, Jr. et al. | |
| 6,988,435 B2 | 1/2006 | Kao | |
| 7,380,343 B2 * | 6/2008 | Yoshimura et al. | 30/388 |
| 8,082,825 B2 * | 12/2011 | Butler | 83/58 |
| 8,122,807 B2 * | 2/2012 | Gass et al. | 83/781 |
| 2005/0103172 A1 * | 5/2005 | Bohne et al. | 83/168 |
| 2006/0042440 A1 * | 3/2006 | Quinlan | 83/100 |
| 2006/0272464 A1 * | 12/2006 | Chen | 83/100 |
| 2010/0269654 A1 * | 10/2010 | Needel et al. | 83/100 |
| 2010/0307308 A1 * | 12/2010 | Butler | 83/100 |
| 2011/0048205 A1 * | 3/2011 | Chung | 83/477.2 |
| 2011/0162500 A1 * | 7/2011 | Frolov | 83/100 |
| 2012/0036972 A1 * | 2/2012 | Frolov | 83/168 |
| 2012/0036976 A1 * | 2/2012 | Frolov | 83/473 |

FOREIGN PATENT DOCUMENTS

| | | |
|---|---|---|
| DE | 3500371 | 7/1986 |
| JP | 2007290235 | 11/2007 |
| WO | 8905714 A1 | 6/1989 |

OTHER PUBLICATIONS

International Search Report in corresponding PCT application (i.e., PCT/US2011/056382), completed Jan. 19, 2012 (8 pages).

* cited by examiner

*Primary Examiner* — Omar Flores Sanchez
(74) *Attorney, Agent, or Firm* — Maginot, Moore & Beck

(57) ABSTRACT

A power tool includes a table structure having a work surface and a motor assembly having an output drive positioned under the work surface. The motor assembly is adjustable relative to the work surface between a first position that is close to the work surface and a second position that is further from the work surface. A fan member is coupled to the motor assembly to generate an airflow. A blade case is positioned under the work surface including a first sidewall and an opposing second sidewall, and an air guide configured to channel the airflow into the blade case through an opening in the first sidewall. The air guide is further configured to move with the motor assembly between the first position and the second position. The air guide covers the opening in both the first position and the second position.

16 Claims, 9 Drawing Sheets

TABLE SAW HAVING AIRFLOW APPARATUS

TECHNICAL FIELD

The present disclosure relates generally to power saws, and particularly to power saws having a debris collection system.

BACKGROUND

One type of cutting tool is a power saw that includes an electrical motor mounted below a work surface. Users frequently refer to this type of power saw as a table saw, because the work surface resembles a tabletop and, therefore, is commonly referred to as a table. The table has an opening that allows a portion of the cutting tool, usually a saw blade, to extend above the surface of the table. The blade, which is rotatably connected to the electrical motor, is movable relative to the surface of the table to enable a user of the table to make cuts of a particular depth or angle. For example, to adjust the height of the blade, a user may position a workpiece adjacent to the blade and then adjust the height of the blade such that the apex of the blade extends just above the thickest portion of the workpiece. To cut the workpiece, a user positions the workpiece on the table, such that a line representing the cutting path of the blade is aligned with a region of the workpiece to be cut. Next, the user energizes the electrical motor, which rotates the blade. After the blade has reached full angular velocity, the user moves the workpiece toward the rotating blade, such that the workpiece contacts the narrow edge of the blade. As the blade cuts through the workpiece, it generates dust, chips, and other workpiece debris, which may be collected by a debris collection system.

Table saw debris collection systems, commonly referred to as dust collectors, direct the workpiece debris into a collection receptacle such as a porous bag or other suitable container. Additionally or alternatively, an external negative pressure source, such as a vacuum may be configured to draw the debris from a debris exit port of the table saw into a container. Some users, however, may desire a table saw having a dust collector, which functions effectively without a separate negative pressure source. Accordingly, further developments in the area of table saw dust collection systems are desirable.

SUMMARY

A power tool includes a table structure including a work surface, a motor assembly including an output drive positioned under the work surface, the motor assembly is infinitely adjustable relative to the work surface between a first position that is close to the work surface and a second position that is further from the work surface, a fan member coupled to the motor assembly and configured to generate an airflow, a blade case positioned under the work surface, the blade case including a first sidewall and an opposing second sidewall, and an air guide configured to channel the airflow into the blade case through an opening in the first sidewall, and the air guide further configured to move with the motor assembly between the first position and the second position, wherein the air guide covers the opening in both the first position and the second position.

In accordance with another embodiment of the present disclosure a cutting apparatus includes a table structure including a work surface, a blade case positioned under the work surface, the blade case including an airflow opening, an electrical motor assembly moveable relative to the blade case, a fan member connected to the electrical motor assembly, and a duct member connected to the electrical motor assembly and positioned in the airflow opening, the duct member providing an airflow channel from the fan member to the blade case.

In accordance with yet another embodiment of the present disclosure a table saw includes a table structure having a work surface, a motor assembly configured to rotate a saw blade, the motor assembly being adjustable relative to the work surface, a fan member coupled to the motor assembly and configured to generate an airflow during rotation of the saw blade, a blade case covering at least a portion of the saw blade, the blade case defining a blade case outlet and an access opening, and a guide structure extending through the access opening and having a guide input and a guide output, the guide input being positioned to receive the airflow, and the guide output being positioned within the blade case, wherein the guide structure further includes a channel extending between the guide input with a flange extending outwardly from the channel, wherein adjustment of the motor assembly in relation to the work surface causes adjustment of the guide structure in relation to the blade case, and further wherein the flange is positioned to cover the access opening during adjustment of the guide structure in relation to the blade case.

BRIEF DESCRIPTION OF THE FIGURES

Features of the present disclosure should become apparent to those of ordinary skill in the art to which this device pertains from the following description with reference to the figures, in which.

DETAILED DESCRIPTION

For the purpose of promoting an understanding of the principles of the device described herein, reference is made to the embodiment(s) illustrated in the figures and described in the following written specification. It is understood that no limitation to the scope of the device is thereby intended. It is further understood that the device includes any alterations and modifications to the illustrated embodiment(s) and includes further applications of the principles of the device as would normally occur to one of ordinary skill in the art to which this device pertains.

Figure 1:
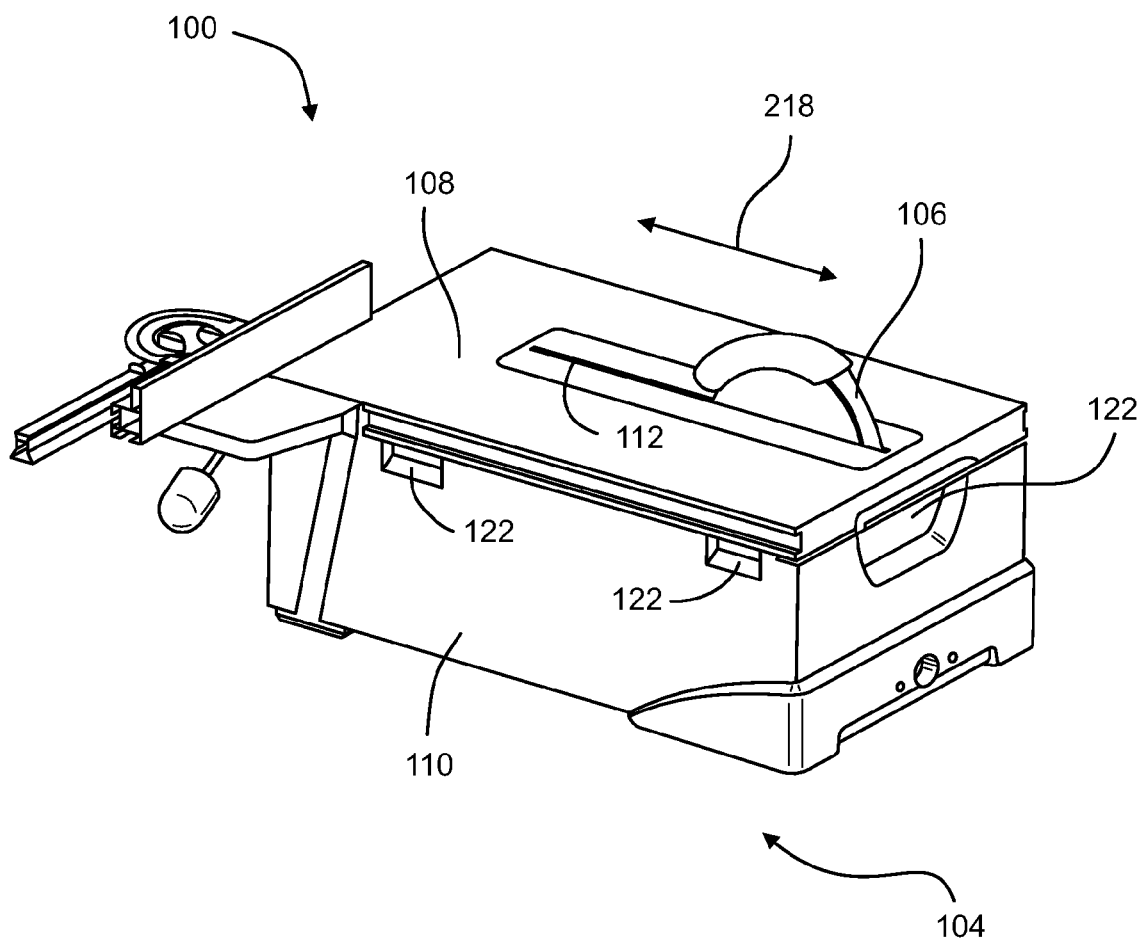
FIG. 1 is a perspective view of a table saw having an enclosure assembly and a blade assembly, the blade assembly including an airflow apparatus, which is not shown in FIG. 1.

As shown in FIG. 1, a table saw 100 includes an enclosure assembly 104 and a blade assembly 106. The enclosure assembly 104 includes a table structure 108 and a frame 110. The table 108 includes an opening 112 through which a top portion of the blade assembly 106 extends. The table 108 has a generally planar upper surface, which may be referred to as a work surface. The table 108, as shown in FIG. 1, is made of aluminum. In other embodiments, the table 108 may be formed from plastic, composite materials, or the like.

The frame 110 is connected to a bottom portion of the table 108 and is configured to define an internal space in which the bottom portion of the blade assembly 106 is positioned. In the embodiment of FIG. 1, the frame 110 is formed from sheet metal; however, in other embodiments, the frame may be formed from plastic, aluminum, composite materials, or the like. The frame 110 includes numerous handles 122, which enable a user to carry the table saw 100 conveniently. Each of the handles 122 may have a corresponding handle located on an opposite side of the frame 110. The corresponding handles are not visible in FIG. 1.

The blade assembly 106 has a fixed position in the direction 218. In another embodiment, however, the blade assembly 106 is mounted to a slide assembly (not shown). The slide assembly enables the blade assembly 106 to move in the direction 218 relative to the table 108. Embodiments of the table saw 100 including the slide assembly may be referred to as a "push-pull" saw.

Figure 2:
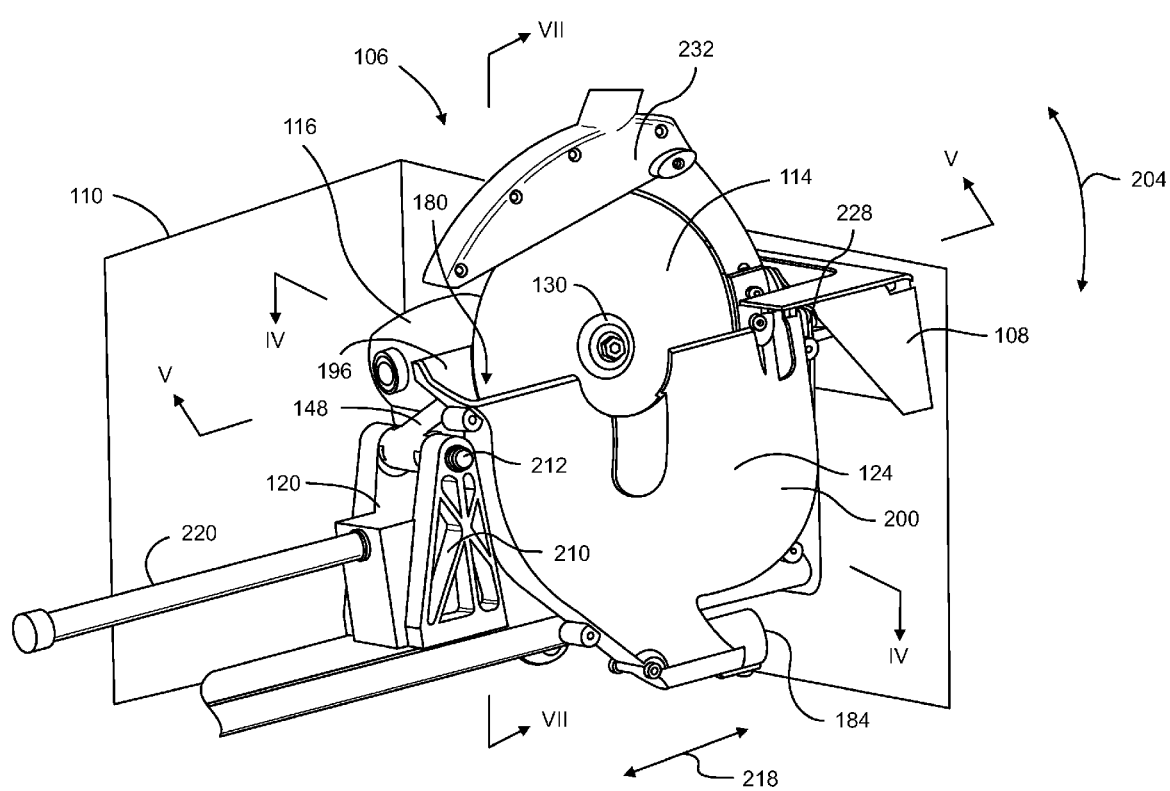
FIG. 2 is a cutaway perspective view of a portion of the table saw of FIG. 1.
Figure 6:
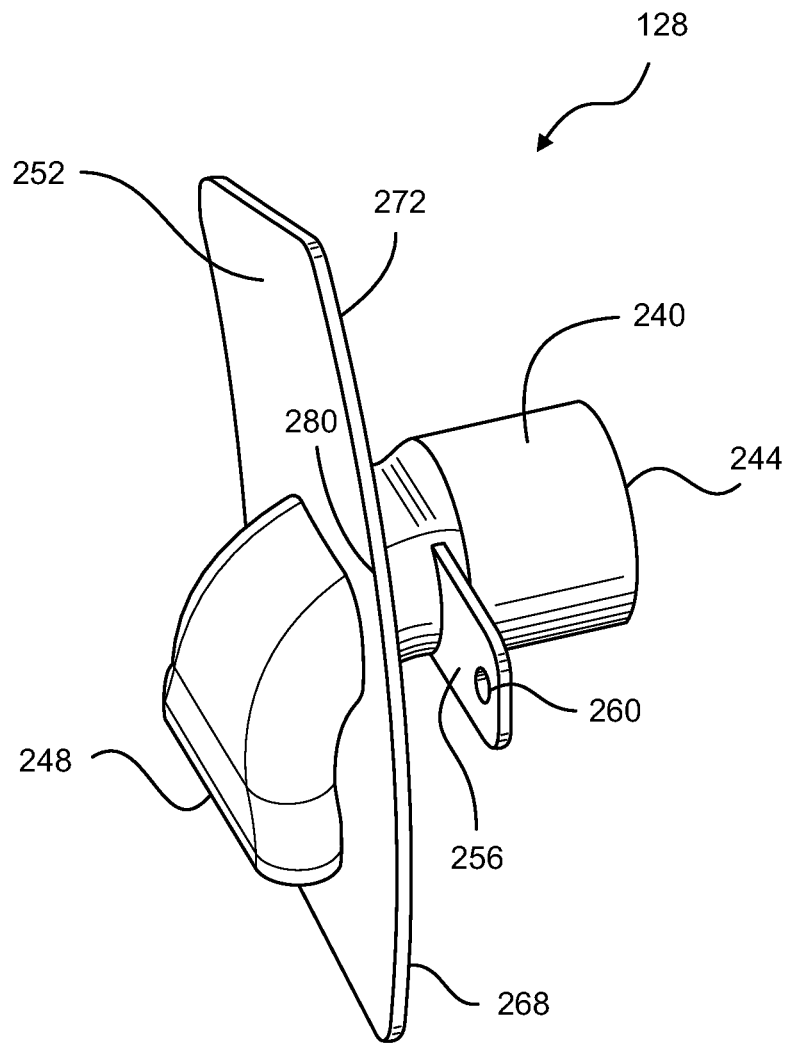
FIG. 6 is a perspective view of the airflow apparatus of the blade assembly of the table saw of FIG. 1.

As shown in FIG. 2, the blade assembly 106 includes a blade 114, an upper blade guard 232, an electrical motor assembly 116, a carriage 120, a blade case 124, and an air guide referred to as a guide structure or a duct member 128 (hidden from view in FIG. 2, best shown in FIG. 6). The duct member 128 directs an airflow generated by the motor assembly 116 into the blade case 124. The airflow evacuates workpiece debris generated by the blade 114 from the blade case 124.

With continued reference to FIG. 2, the blade 114 is a cutting instrument, which is partially positioned within the blade case 124. The blade 114, which may be a circular saw blade, is typically machined from metal. A coupling device 130 connects the blade 114 to the motor assembly 116. In particular, the coupling device 130 connects the blade 114 to a portion of the motor assembly 116 extending into the blade case 124. The blade 114 is configured to cut through a workpiece placed in contact therewith and generates workpiece debris as the workpiece is cut.

The upper blade guard 232, as shown in FIG. 2, defines an internal cavity in which a portion of the blade 114 is positioned. Specifically, the portion of the blade 114 that is positioned above the table 108 is at least partially positioned within the internal cavity of the upper blade guard 232.

Figure 3:
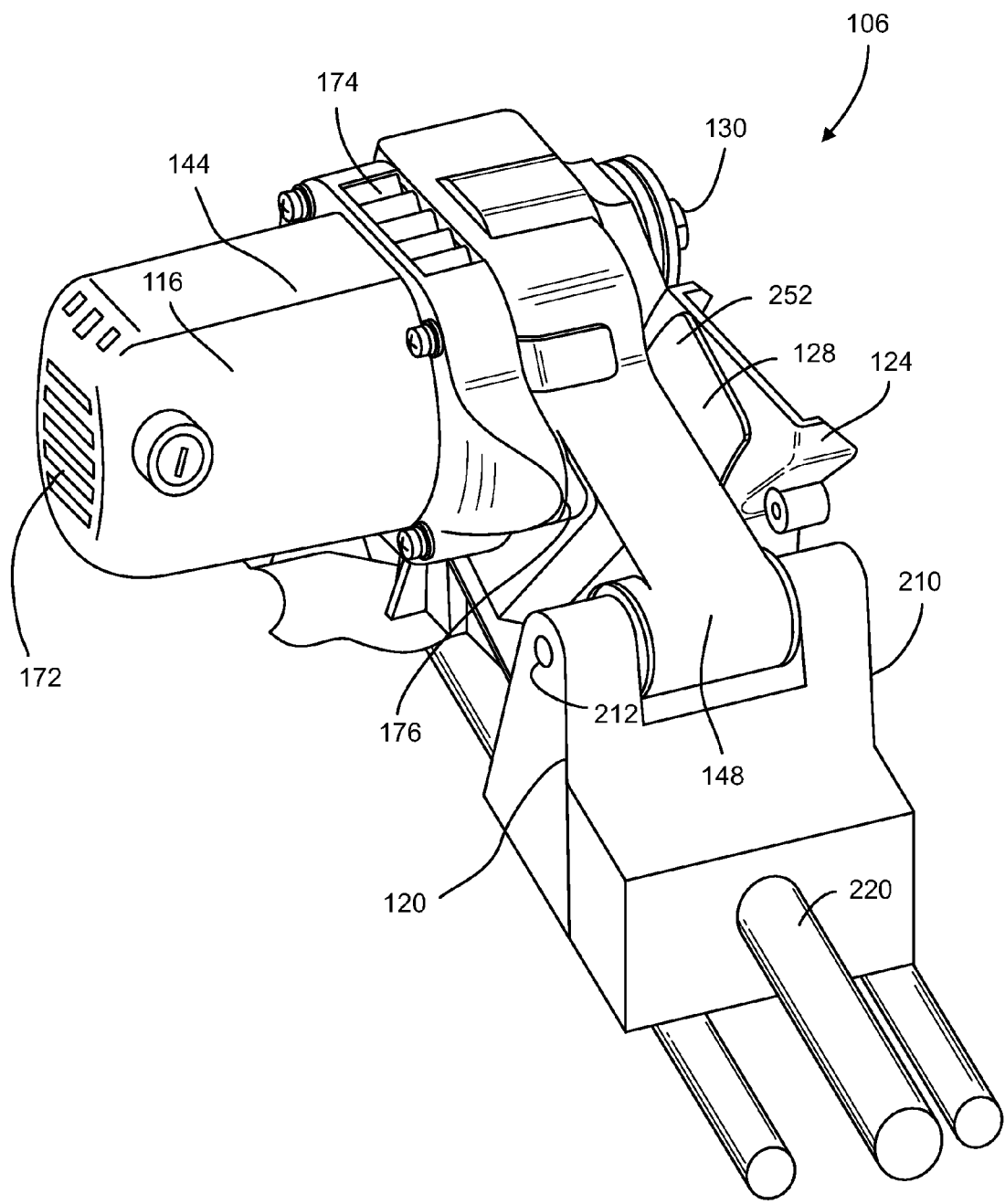
FIG. 3 is a cutaway perspective view of another portion of the table saw of FIG. 1.
Figure 4:
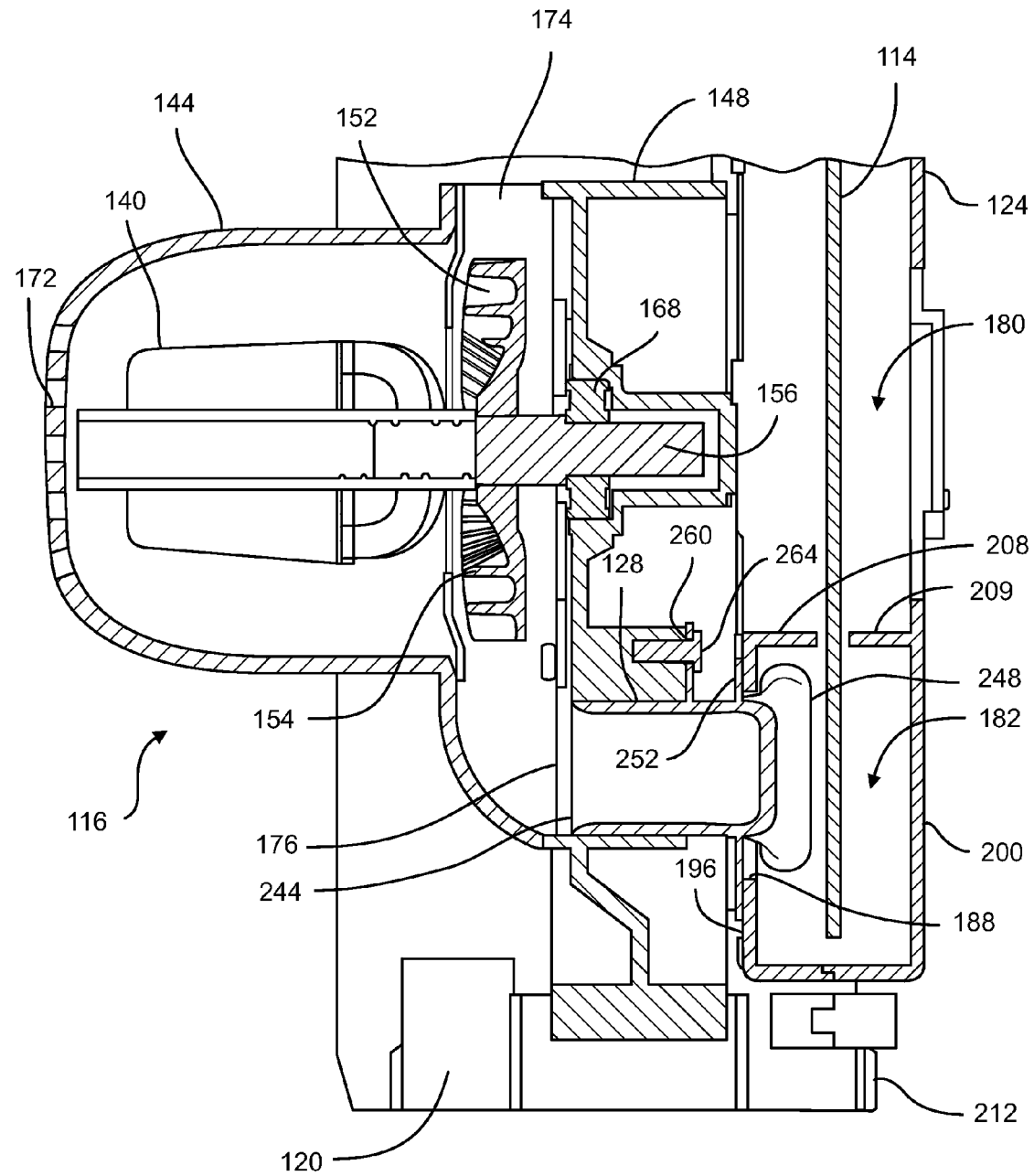
FIG. 4 is a cutaway cross sectional view taken along the line IV-IV of FIG. 2.

The motor assembly 116, shown in FIG. 3, is positioned below the table 108 under the work surface. The motor assembly 116, which is configured to rotate the blade 114, includes a motor housing 144 connected to a gear housing 148, an electrical motor 140 (FIG. 4), and a fan member 152 (FIG. 4). The motor housing 144 includes an airflow intake port 172 and an airflow outlet port referred to herein as an airflow exhaust port 176 (best shown in FIG. 4). The intake port 172 and the exhaust port 176 are openings, holes, and or slots in the motor housing 144, which permit air to flow through the motor housing. Air enters the motor housing 144 through the intake port 172, and air exits the motor housing through the exhaust port 176. An air baffle 174 is provided in the motor housing 144 to guide the air through the motor housing and to prevent any dead airflow pockets. The air baffle 174 also helps to control the cross sectional airflow and to guide the air coming off the fan member 152 out of the motor housing 144 and through the exhaust port 176 efficiently. The airflow through the motor housing 144 may cool the electrical motor 140. The motor housing 144 may be made of metal, plastic, composite materials, and/or other sufficiently rigid materials.

With reference to FIG. 4, the electrical motor 140 and the fan member 152 are at least partially positioned within the motor housing 144. The electrical motor 140 includes an output drive referred to herein as a motor shaft 156, which rotates in response to the electrical motor being coupled to a source of electrical energy. The motor shaft 156 is rotatably supported by a bearing 168. The electrical motor 140 may be any type of electrical motor capable of generating a drive torque sufficient to maintain rotation of the blade 114 as it cuts through a workpiece.

The fan member 152 is coupled to the motor shaft 156 and is configured to generate an airflow. As shown in FIG. 4, the fan member 152 is connected directly to the motor shaft 156 to rotate with the same angular velocity as the motor shaft. In other embodiments of the motor assembly 116, however, the fan member 152 may be coupled to the motor shaft 156 via a transmissive link. The fan member 152 includes numerous air-catching fins 154, which are formed from a rigid material such as metal, plastic, glass-filled Nylon, or the like. In general, the fan member 152 has a circular outer periphery and is balanced about a center point to enable the fan member to rotate smoothly. The fan member 152, when rotated, draws air through the intake port 172 of the motor housing 144, past the motor 140, and expels air through the exhaust port 176 and the air baffle 174 of the motor housing 144. In an embodiment of the motor assembly 116 without the air baffle 174, the airflow of the fan member 152 may be directed entirely through the exhaust port 176 and directly into the blade case 124. The amount of airflow generated by the fan member 152 is dependent on the angular velocity of the motor shaft 156, the configuration of the fan member, and the backpressure generated as a result of the cross-sectional area of the exhaust port 176, among other factors.

The gear housing 148 of the motor assembly 116, as shown in FIG. 4, houses the elements, which couple rotation of the motor shaft 156 to the blade 114. For example, the gear housing 148 may house a gear train (not shown), which couples rotation of the motor shaft 156 to the blade 114. An exemplary gear train may include a one-stage gear fixedly connected to a blade shaft (not shown), which is configured to mate with a motor armature gear fixedly connected to the motor shaft 156. In another exemplary embodiment, the motor shaft 156 may extend through and protrude from the gear housing 148, such that the blade 114 may be connected directly to the motor shaft. The gear housing 148 may be made of metal, plastic, composite materials, or other sufficiently rigid materials.

With reference again to FIG. 3, the motor assembly 116 is pivotally connected to the carriage 120, such that the motor assembly is adjustable/movable relative to the work surface of the table 108 between an upper position and a lower position. The carriage 120 includes a support frame 210, a pivot shaft 212, and an adjustment shaft 220. The pivot shaft 212 pivotally connects the gear housing 148 of the motor assembly 116 to the support frame 210. As a result of the pivotal connection, the motor assembly 116, the blade 114, and the duct 128 are configured to move relative to the support frame 210 and the blade case 124 along an arcuate path 204 shown in FIG. 2. In particular, a user may manipulate an adjustment shaft 220 to pivot the motor assembly 116 about the pivot shaft 212 between the upper position in which the motor assembly is close to the work surface table 108 and the blade 114 extends above the surface of the table, and the lower position in which the motor assembly is further from the work surface of the table and the blade extends to a lesser extent above the surface of the table. In another embodiment, the motor assembly 116 moves linearly up and down on one or more shafts (not shown).

As shown in FIG. 2, the table saw 100 may be configured such that a user may further manipulate the adjustment mechanism 220 to tilt the blade 114, the upper blade guard 232, the motor assembly 116, the carriage 120, the blade case 124, and the duct member 128 about the pivot point 228. Tilting these elements enables the blade 114 to be positioned in a non-perpendicular orientation relative to the work surface of the table 108. Of course, in other embodiments, the blade 114 and other elements may have a fixed angular relationship with the surface of the table 108.

Figure 5A:
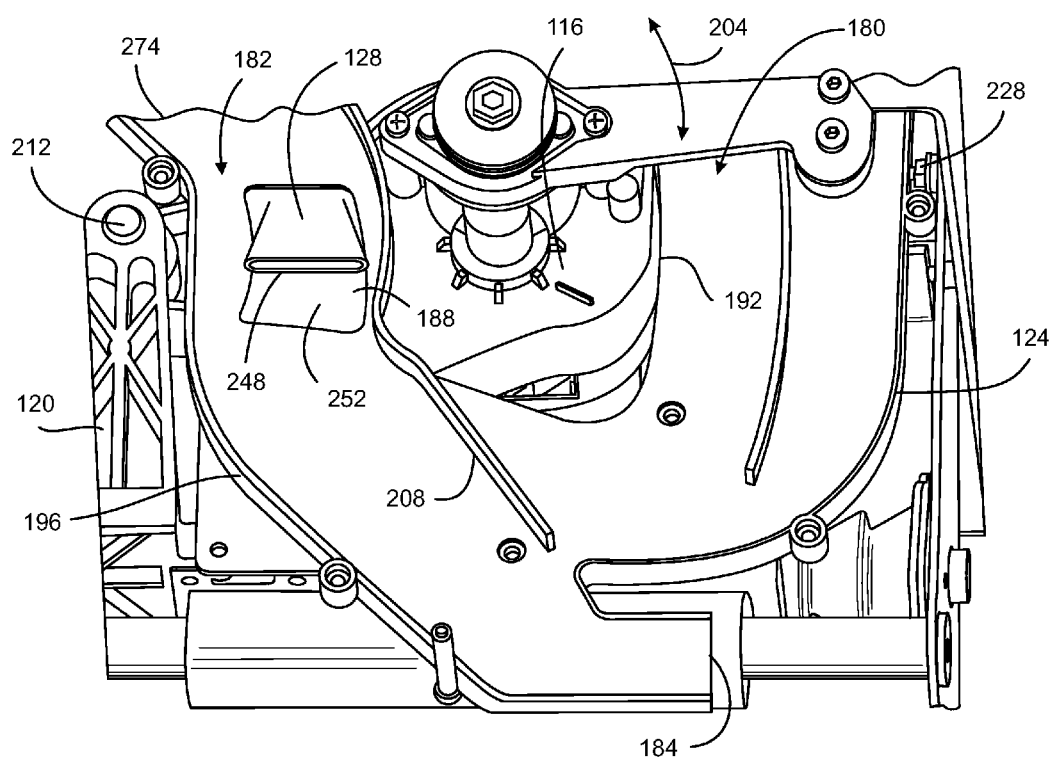
FIG. 5A is a cutaway cross sectional view taken along the line V-V of FIG. 2 showing the motor assembly and the airflow apparatus in a raised position, a blade of the table saw is not shown in FIG. 5A.
Figure 5B:
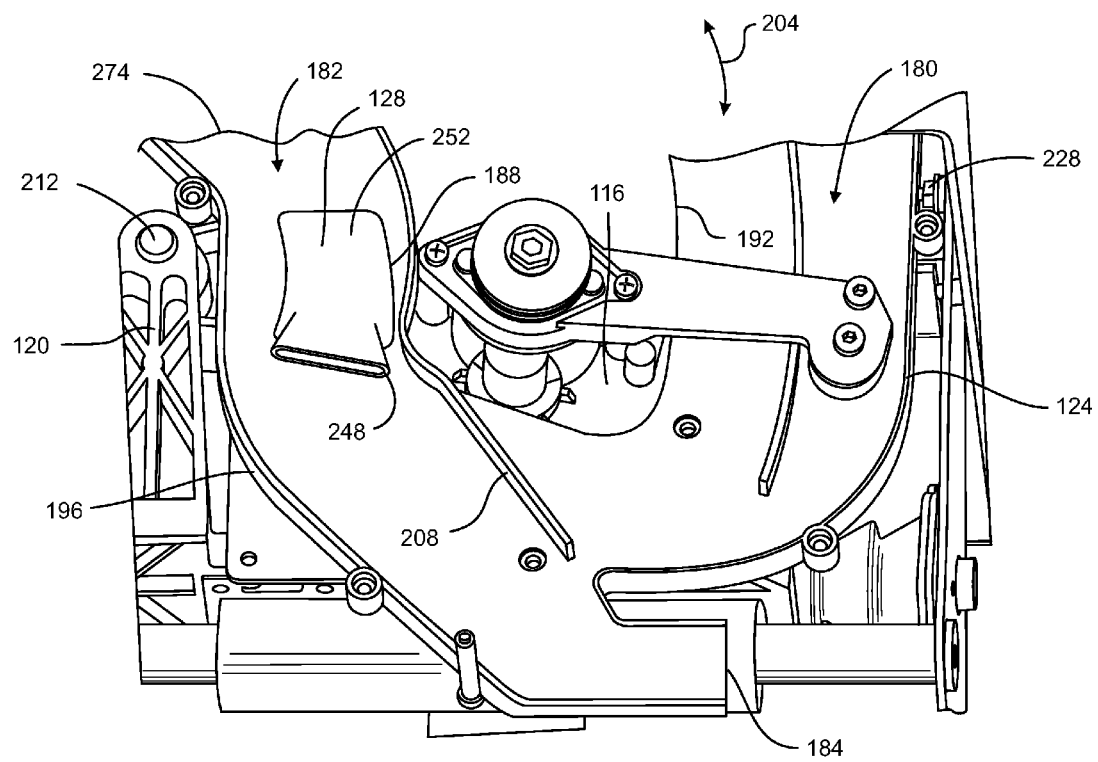
FIG. 5B is a cutaway cross sectional view taken along the line V-V of FIG. 2 showing the motor assembly and the airflow apparatus in a lowered position, a blade of the table saw is not shown in FIG. 5B.

With reference now to FIGS. 2, 5A, and 5B, the blade case 124 of the blade assembly 106 is positioned under the work surface of the table 108. The blade case 124 is connected to the support frame 210 of the carriage 120, and the blade case is separate from (not connected to) the motor assembly 116. The blade case 124 includes a first sidewall 196 connected to an opposite second sidewall 200. Together, the sidewalls 196, 200 define a blade cavity 180 and an exhaust port 184. At least a portion of the blade 114 is configured to be positioned within the blade cavity 180. Accordingly, the blade cavity 180 has a width, defined between the sidewalls 196, 200, which enables the portion of the blade 114 within the blade cavity to rotate without contacting any portion of the blade case 124. The exhaust port 184, which may also be referred to as a blade case outlet, terminates a lower portion of the blade case 184 and is directed toward the rear of the table saw 100.

With continued reference to FIGS. 5A and 5B, the first sidewall 196 contains two openings provided as an airflow window 188 and a motor window 192. The airflow window 188, which may also be referred to as an access window or an airflow opening, is positioned on an upper portion of the first sidewall 196 and enables a portion of the duct 128 to extend into a region of the blade cavity 180 referred to herein as a dust chute 182. The dust chute 182 is defined in FIGS. 5A and 5B as the region of the blade cavity 180 to the left of rib 208, which is connected to the first sidewall 196. A rib 209 (FIG. 4) is connected to the second sidewall 200, and corresponds to the position of the rib 208, but is not shown in FIGS. 5A and 5B. Furthermore, the dust chute 182 extends from between the exhaust port 184 and a portion of the blade case 124 above the airflow window 188.

The motor window 192, which is also referred to as a motor access window/opening, is a cutout in the first sidewall 196, which enables the motor assembly 116 to move up and down relative to the blade case 124 between the upper position and the lower position without contacting the blade case. To this end, at least a portion of the motor assembly 116, e.g. the shaft (the output drive) to which the blade 114 is connected, extends through the motor window 192.

With reference again to FIG. 3, the duct member 128 of the blade assembly 106, is connected to the motor housing 144 of the motor assembly 116 and extends into the blade cavity 180 through the airflow window 188. The duct member 128, as shown in isolation in FIG. 6, includes a tube member 240, a flange 252, and a mounting tab 256. The tube member 240 is provided as an airflow channel, which channels airflow from the fan member 152 into the dust chute 182 of the blade case 124 for each position of the motor assembly 116 relative to the blade case 124. The tube member 240 extends through the gear housing 148 and into the blade cavity 180; although, in other embodiments the tube member may extend from the motor assembly 116 and into the blade cavity without passing through the gear housing. The tube member 240 extends between a guide input referred to as an input port 244 and a guide output referred to as an outlet port or an output port 248. The input port 244 is positioned on an outer side of the first sidewall 196 and is connected to the exhaust port 176 of the motor housing 144 to receive the airflow generated by the rotating fan member 152 (FIG. 4). The output port 248 is positioned on an inner side of the first sidewall 196 and is positioned to direct the airflow downward toward the exhaust port 184 and away from the work surface of the table 108 (see FIGS. 5A and 5B).

The mounting tab 256 of the duct member 128 is generally planar and extends radially outward from the tube member 240. The mounting tab 256 includes at least one opening 260 through which a fastening member 264 extends to attach fixedly the duct member 128 to the gear housing 148 of the motor assembly 116. Accordingly, the duct member 128 is configured to move with the motor assembly 116 between the upper position and the lower position.

With reference to FIG. 6, a cover plate/member provided as the flange 252 extends radially outward from the tube member 240, and is designed and dimensioned to cover a perimeter of the airflow window 188 (FIGS. 5A and 5B) for positions of the motor assembly 116 between and including the upper position and the lower position. The flange 252 defines a plane that is generally parallel to a plane defined by the first sidewall 196. The flange 252 is designed and dimensioned to cover a perimeter of the airflow window 188 for each position of the motor assembly 116 relative to the blade case 124. The path 204 (FIGS. 5A and 5B) of the motor assembly 116 determines the configuration of the periphery of the flange 252. As described above, the carriage 120 moves the motor assembly 116 relative to the blade case 124 along the arcuate path 204. Accordingly, the flange 252 has an arcuate profile to match the movement of the motor assembly 116. In other embodiments of the table saw 100, however, the carriage 120 may move the motor assembly 116 along a different path, for example a linear path. In such an embodiment, the flange 252 may have a periphery, which matches at least approximately the linear path of the motor assembly 116.

In operation, the table saw 100 evacuates workpiece debris from the blade case 124 with the airflow generated by the fan member 152. To operate the table saw 100 a user manipulates the carriage 120 to adjust the height of the blade 114 relative to the table 108 and the workpiece. As the height of the blade 114 is adjusted, the motor assembly 116 and the duct member 128 both move along the path 204 (FIGS. 5A and 5B) relative to the table 108 and the blade case 124. Accordingly, the duct member 128 moves within the airflow window 188 and the shaft to which the blade 114 is connected moves within the motor window 192. The upper and lower extremes of this movement are illustrated in FIGS. 5A and 5B, with FIG. 5A showing the motor assembly 116 in the upper position and FIG. 5B showing the motor assembly in the lower position. The user may also tilt the blade 114 about the pivot point 228; however, tilting the blade does not change the position of the duct member 128 or the motor assembly 116 relative to the blade case 124.

Figure 7A:
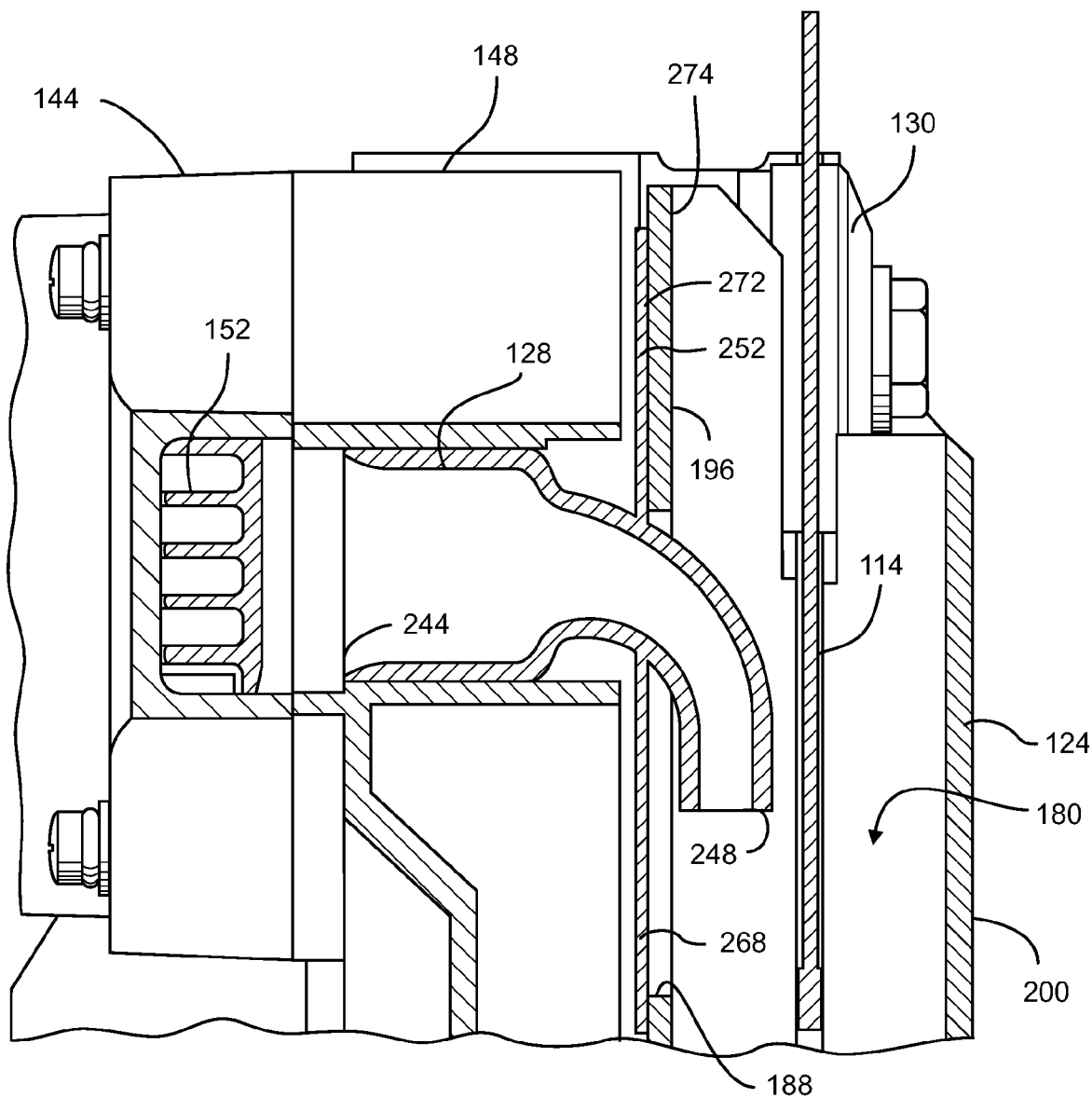
FIG. 7A is a cutaway cross sectional view taken along the line VII-VII of FIG. 2 and showing the motor assembly and the airflow apparatus in a raised position.
Figure 7B:
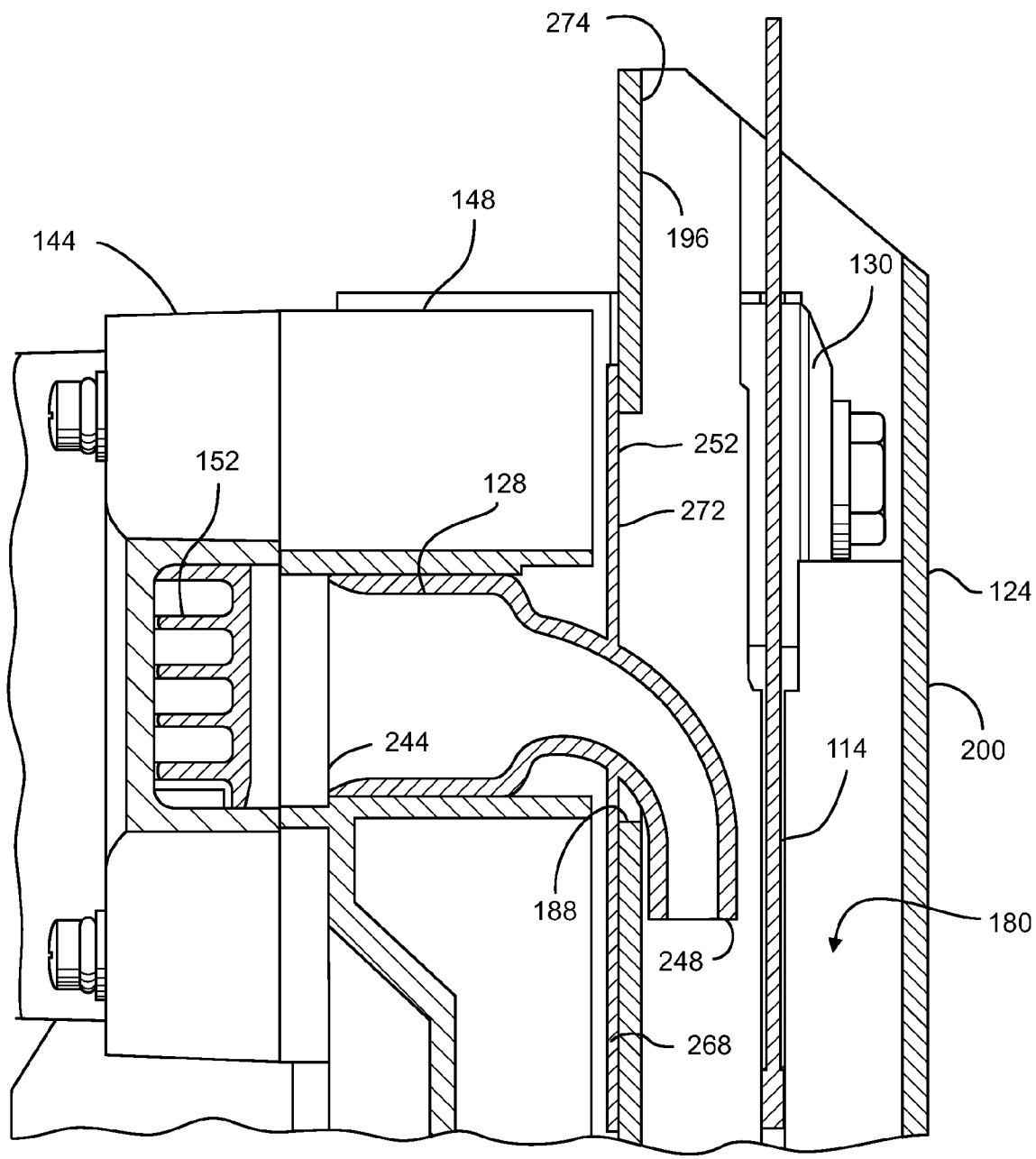
FIG. 7B is a cutaway cross sectional view taken along the line VII-VII of FIG. 2 and showing the motor assembly and the airflow apparatus in a lowered position.

During movement of the motor assembly 116 (and when the motor assembly is positioned in a desired location), the flange 252 covers the airflow window 188. Specifically, as shown in FIG. 7A, when the motor assembly 116 is in the upper position, the tube member 240 is positioned near the top of the airflow window 188 and a bottom portion 268 of the flange 252 covers the airflow window. As shown in FIG. 7B, when the motor assembly 116 is in the lower position the tube member 240 is positioned near the bottom of the airflow window 188 and a top portion 272 of the flange 252 covers the airflow window.

After the height of the blade 114 has been adjusted, the user energizes the electrical motor 140 to rotate the blade 114. As described above, the fan member 152 also begins to rotate in response to the electrical motor 140 being energized. Rotation of the fan member 152 generates the airflow which exits the exhaust port 176 and flows into the duct member 128 (see FIG. 4). The duct member 128 directs the airflow through the airflow window 188 and into the dust chute 182 of the blade cavity 180. The dust chute 182 is configured to direct the airflow from the output port 248 of the duct member 128 toward the exhaust port 184 of the blade cavity 124.

Next, the user moves a workpiece toward the rotating blade to cut the workpiece. In response to contacting the blade, the workpiece is cut and dust, chips, fibers, and other such workpiece debris are generated. In particular, most of the workpiece debris is generated after the blade teeth break through the workpiece just below the table 108 and at the top of dust chute 182. Accordingly, the airflow within the dust chute 182 tends to draw the workpiece debris into the dust chute 182 and then evacuates the workpiece debris through the exhaust port 184. A user may connect a collection bag (not illustrated) to the exhaust port 184 to collect the workpiece debris without a negative pressure source, such as a vacuum, being connected to the table saw 100. Nonetheless, a user may connect a vacuum to the exhaust port 184 to enhance the debris collection ability of the table saw 100. Additionally, a user may connect a source vacuum hose to the rear of the table saw and an intermediate vacuum hose may fluidly couple the source vacuum hose to the exhaust port 184.

In another embodiment of the table saw 100, the duct member 128 may include a flexible tube member (not shown) extending between the exhaust port 176 of the motor assembly 116 and the airflow window 188. A first end portion of the flexible tube member is connected to the exhaust port 176 and a second end portion of the flexible tube member is connected to the airflow window 188 of the blade case 124. In this embodiment, the duct member 128 flexes relative to the blade case 124 and the motor assembly 116 in response to movement of the motor assembly. The duct member 128, in this embodiment, may include a flange that covers any portion of the airflow window 188 unoccupied by the flexible tube member. Alternatively, the flexible tube member may occupy the entire airflow window 188.

The device described herein has been illustrated and described in detail in the figures and foregoing description, the same should be considered as illustrative and not restrictive in character. It is understood that only the preferred embodiments have been presented and that all changes, modifications, and further applications that come within the spirit of the device described herein are desired to be protected.

What is claimed is:

1. A cutting apparatus comprising:
    a table structure including a work surface;
    a blade case positioned under the work surface, the blade case including an airflow opening;
    an electrical motor assembly moveable relative to the blade case;
    a fan member connected to the electrical motor assembly;
    a duct member connected to the electrical motor assembly and positioned in the airflow opening, the duct member providing an airflow channel from the fan member to the blade case, wherein the duct member includes an input port and an outlet port with a tube member extending between the input port and the outlet port, wherein the input port is positioned on an outer side of the first sidewall of the blade case and the outlet port is positioned on an inner side of the first sidewall of the blade case;
    a cover member connected to the duct member, the cover member covering the airflow opening when the electrical motor assembly and the duct member are moved relative to the blade case; and
    a mounting tab extending radially outward from the tube member.

2. A table saw comprising:
    a table structure having a work surface;
    a motor assembly configured to rotate a saw blade, the motor assembly being adjustable relative to the work surface;
    a fan member coupled to the motor assembly and configured to generate an airflow during rotation of the saw blade;
    a blade case covering at least a portion of the saw blade, the blade case defining a blade case outlet and an access opening; and
    a guide structure extending through the access opening and having a guide input and a guide output, the guide input being positioned to receive the airflow, and the guide output being positioned within the blade case, wherein the guide structure further includes a channel extending between the guide input with a flange extending outwardly from the channel, wherein adjustment of the motor assembly in relation to the work surface causes adjustment of the guide structure in relation to the blade case, and further wherein the flange is positioned to cover the access opening during adjustment of the guide structure in relation to the blade case.

3. The table saw of claim 2, wherein the channel is defined by a tube member extending between the guide input and the guide output.

4. A cutting apparatus comprising:
    a table structure including a work surface;
    a blade case positioned under the work surface, the blade case including an airflow opening;
    an electrical motor assembly moveable relative to the blade case;
    a fan member connected to the electrical motor assembly;
    a duct member connected to the electrical motor assembly and positioned in the airflow opening, the duct member providing an airflow channel from the fan member to the blade case; and
    a cover member connected to the duct member, the cover member covering the airflow opening when the electrical motor assembly and the duct member are moved relative to the blade case,
    wherein the duct member includes an input port and an outlet port with a tube member extending between the input port and the outlet port, wherein the input port is positioned on an outer side of the first sidewall of the blade case and the outlet port is positioned on an inner side of the first sidewall of the blade case, and
    wherein the cover member extends radially outward from the tube member.

5. The cutting apparatus of claim 4 wherein the blade case further includes a first sidewall and an opposing second sidewall, the airflow opening positioned in the first sidewall.

6. The cutting apparatus of claim 5 wherein the blade case further includes a motor access opening positioned in the first sidewall.

7. The cutting apparatus of claim 6 wherein an output drive of the electrical motor assembly extends through the motor access opening.

8. The cutting apparatus of claim 7 further comprising a circular saw blade positioned within the blade case and coupled to the output drive of the electrical motor assembly.

9. The cutting apparatus of claim 4 further comprising a mounting tab extending radially outward from the tube member.

10. The power tool of claim 4 wherein the duct member is configured to direct air into the blade case in a substantially downward direction away from the work surface.

11. A power tool comprising:
a table structure including a work surface;
a motor assembly including an output drive positioned under the work surface, the motor assembly is adjustable relative to the work surface between a first position that is close to the work surface and a second position that is further from the work surface;
a fan member coupled to the motor assembly and configured to generate an airflow;
a blade case positioned under the work surface, the blade case including a first sidewall and an opposing second sidewall; and
an air guide configured to channel the airflow into the blade case through an opening in the first sidewall, and the air guide further configured to move with the motor assembly between the first position and the second position, wherein the air guide covers the opening in both the first position and the second position,
wherein the air guide includes a tube member positioned in the opening, the tube member having an input port and an outlet port, the input port being positioned on an outer side of the first sidewall of the blade case and the outlet port being positioned on an inner side of the first sidewall of the blade case, the tube member being movable with the motor assembly between the first position and the second position, and
wherein the opening in the first sidewall is sized to permit the tube member to move with respect to the blade case such that the tube member extends through a first portion of the opening when the motor assembly is in the first position and extends through a second portion of the opening when the motor assembly is in the second position.

12. The power tool of claim 11 wherein the opening in the first sidewall is a first opening and a portion of the motor assembly extends through a second opening in the first sidewall.

13. The power tool of claim 12 further comprising a circular saw blade positioned within the blade case and coupled to the portion of the motor assembly that extends through the second opening in the first sidewall.

14. The power tool of claim 11 wherein the air guide includes a cover plate configured to extend outward from the tube member, wherein the cover plate is designed and dimensioned to cover a perimeter of the opening in the first sidewall when the motor assembly is in the first position and when the motor assembly is in the second position.

15. The power tool of claim 14 further comprising a mounting tab extending outward from the tube member, wherein the air guide is fixedly attached to the motor assembly at the mounting tab.

16. The power tool of claim 11 wherein the outlet port is configured to direct the airflow into the blade case in a substantially downward direction away from the work surface.

* * * * *